US011507903B2

(12) United States Patent
Copeland

(10) Patent No.: US 11,507,903 B2
(45) Date of Patent: Nov. 22, 2022

(54) DYNAMIC FORMATION OF INSIDE SALES TEAM OR EXPERT SUPPORT TEAM

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/948,837

(22) Filed: Oct. 1, 2020

(65) Prior Publication Data

US 2022/0108261 A1  Apr. 7, 2022

(51) Int. Cl.
*G06Q 10/00*  (2012.01)
*G06Q 10/06*  (2012.01)
*G06Q 30/00*  (2012.01)
*G06Q 30/02*  (2012.01)
*G06N 5/02*  (2006.01)
(Continued)

(52) U.S. Cl.
CPC ......... *G06Q 10/063118* (2013.01); *G06F 16/24578* (2019.01); *G06F 16/9024* (2019.01); *G06F 16/9535* (2019.01); *G06N 5/02* (2013.01); *G06Q 10/06398* (2013.01); *G06Q 10/105* (2013.01); *G06Q 30/016* (2013.01); *G06Q 30/0201* (2013.01)

(58) Field of Classification Search
None
See application file for complete search history.

(56) References Cited

U.S. PATENT DOCUMENTS 6,785,380 B2  8/2004  Ribera
6,829,603 B1  12/2004  Chai et al.
(Continued)

FOREIGN PATENT DOCUMENTS

KR  1020180058877  7/2018
WO  20160139666 A1  9/2016

OTHER PUBLICATIONS

Geraghty, Shauna, 15 Effective Tips for Training Call Center Agents, Jul. 23, 2017, Talkdesk, https://www.talkdesk.com/blog/15-tips-for-training-call-center-agents/, p. 1-13. (Year: 2017).*
(Continued)

*Primary Examiner* — Joseph M Waesco
(74) *Attorney, Agent, or Firm* — Fish & Richardson P.C.

(57) ABSTRACT

Customer relationship management ("CRM") method implemented in a computer system, including a lead knowledge engine in communication with a plurality of tele-agent stations. The lead knowledge engine includes a semantic graph database with a knowledge graph and a dynamic profiling module configured to identify query tele-agents via tele-agent dashboards to receive internal sales information indicative of product product/service interest and tele-agent experience and expertise. The lead knowledge engine is further configured to query a sales analytics engine and receive external sales information to identify product/service interest and generate target-lead profiles. The lead knowledge engine automatically ranks tele-agents and creates inside sales or expert support teams to support particular products or services, parses leads, and updates tele-agent dashboards.

20 Claims, 4 Drawing Sheets

(51) Int. Cl.
  *G06F 16/9535* (2019.01)
  *G06F 16/2457* (2019.01)
  *G06F 16/901* (2019.01)
  *G06Q 10/10* (2012.01)

(56) References Cited

U.S. PATENT DOCUMENTS

| | | |
|---|---|---|
| 7,275,083 B1 | 9/2007 | Seibel et al. |
| 7,486,785 B2 | 2/2009 | Flores |
| 8,108,237 B2 | 1/2012 | Bourne et al. |
| 8,332,279 B2 | 12/2012 | Woolston |
| 8,411,843 B1 | 4/2013 | Cyriac |
| 9,049,295 B1 | 6/2015 | Cooper |
| 9,165,556 B1 | 10/2015 | Sugar |
| 9,848,082 B1 | 12/2017 | Lilland |
| 9,860,391 B1 | 1/2018 | Wu et al. |
| 9,936,066 B1 | 4/2018 | Mammen et al. |
| 9,942,779 B1 | 4/2018 | Proctor |
| 9,948,783 B1 | 4/2018 | Farrell |
| 10,026,092 B2 | 7/2018 | Heater et al. |
| 10,057,423 B1 | 8/2018 | Sheikh |
| 10,101,976 B2 | 10/2018 | Cavalcante |
| 10,303,466 B1 | 5/2019 | Karman |
| 10,482,384 B1 | 11/2019 | Stoilos |
| 2003/0126136 A1 | 7/2003 | Omoigui |
| 2004/0143473 A1 | 7/2004 | Tivey et al. |
| 2004/0210881 A1 | 10/2004 | Friedman |
| 2005/0005266 A1 | 1/2005 | Datig |
| 2005/0044357 A1 | 2/2005 | Fano |
| 2005/0105712 A1 | 5/2005 | Williams et al. |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0233561 A1 | 10/2007 | Golec |
| 2008/0162498 A1 | 7/2008 | Omoigui |
| 2008/0275744 A1 | 11/2008 | MacIntyre et al. |
| 2009/0070322 A1 | 3/2009 | Salvetti |
| 2009/0132474 A1 | 5/2009 | Ma |
| 2009/0245500 A1 | 10/2009 | Wampler |
| 2009/0271192 A1 | 10/2009 | Marquette |
| 2010/0010802 A1 | 1/2010 | Ruano |
| 2010/0036788 A1 | 2/2010 | Wu |
| 2010/0063799 A1 | 3/2010 | Jamieson |
| 2010/0114563 A1 | 5/2010 | Choi |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1 | 3/2012 | Ferrucci |
| 2012/0233558 A1 | 9/2012 | Naim |
| 2012/0275642 A1 | 11/2012 | Aller |
| 2012/0303355 A1 | 11/2012 | Liu et al. |
| 2013/0091090 A1 | 4/2013 | Spivack et al. |
| 2013/0006916 A1 | 6/2013 | McBride |
| 2013/0163731 A1 | 6/2013 | Yan |
| 2013/0204663 A1 | 8/2013 | Kahlow |
| 2014/0022328 A1 | 1/2014 | Gechter et al. |
| 2014/0081585 A1 | 3/2014 | Cappucino et al. |
| 2014/0081934 A1 | 3/2014 | Mizell |
| 2014/0122535 A1 | 5/2014 | Gerard |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1 | 9/2014 | Tran |
| 2014/0314225 A1 | 10/2014 | Riahi |
| 2014/0372240 A1* | 12/2014 | Freishtat ............ G06Q 30/0623 705/26.1 |
| 2014/0372630 A1 | 12/2014 | Bostick |
| 2014/0379755 A1 | 12/2014 | Kuriakose |
| 2015/0012350 A1 | 1/2015 | Li et al. |
| 2015/0066479 A1 | 3/2015 | Pasupalak |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0254234 A1 | 9/2015 | Dixit et al. |
| 2015/0261743 A1 | 9/2015 | Sengupta |
| 2015/0294405 A1 | 10/2015 | Hanson |
| 2015/0309994 A1 | 10/2015 | Liu |
| 2015/0348551 A1 | 12/2015 | Gruber |
| 2015/0379603 A1 | 12/2015 | Gupta |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0117593 A1 | 4/2016 | London |
| 2016/0162913 A1 | 6/2016 | Linden et al. |
| 2016/0171099 A1 | 6/2016 | Lorge et al. |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0239851 A1 | 8/2016 | Tanner |
| 2016/0162474 A1 | 9/2016 | Agarwal |
| 2016/0321748 A1 | 11/2016 | Mahatm |
| 2016/0335544 A1 | 11/2016 | Bretschneider et al. |
| 2017/0017694 A1 | 1/2017 | Roytman et al. |
| 2017/0024375 A1 | 1/2017 | Hakkani-Tur |
| 2017/0091390 A1 | 3/2017 | Joul |
| 2017/0124193 A1 | 5/2017 | Li |
| 2017/0147635 A1 | 5/2017 | McAteer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0293610 A1 | 10/2017 | Tran |
| 2018/0025303 A1* | 1/2018 | Janz ................. G16H 50/20 705/2 |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0188617 A1* | 6/2019 | Copeland .......... G06F 16/90335 |
| 2019/0206400 A1 | 7/2019 | Cui |
| 2019/0220794 A1 | 7/2019 | Kulkarni |
| 2019/0318433 A1* | 10/2019 | McGee ................. H04L 9/0643 |
| 2019/0325081 A1* | 10/2019 | Liu ...................... G06F 16/3323 |
| 2019/0340294 A1 | 11/2019 | Spangler |
| 2019/0347668 A1* | 11/2019 | Williams ................ G06N 5/046 |
| 2020/0042642 A1 | 2/2020 | Bakis |
| 2020/0097814 A1 | 3/2020 | Devesa |
| 2020/0110835 A1 | 4/2020 | Zhao |
| 2020/0151651 A1* | 5/2020 | Chang ............ G06Q 10/063118 |
| 2020/0294664 A1* | 9/2020 | Stoilos ................... H04L 51/02 |
| 2020/0364069 A1* | 11/2020 | Liu ........................ G06V 20/10 |
| 2021/0232996 A1* | 7/2021 | Copeland ........... G06Q 10/0637 |

OTHER PUBLICATIONS

Jan. 10, 2020 Office Action for corresponding U.S. Appl. No. 15/700,210.

Jan. 25, 2020 Office Action for corresponding U.S. Appl. No. 15/844,512.

Jul. 25, 2019 Office Action for corresponding U.S. Appl. No. 16/198,742.

(56) References Cited

OTHER PUBLICATIONS

Final Office Action dated Jul. 27, 2020 for corresponding U.S. Appl. No. 15/844,512.
Final Office Action dated Jul. 30, 2020 for corresponding U.S. Appl. No. 16/154,718.
Final Office Action dated Jul. 7, 2020 for corresponding U.S. Appl. No. 15/700,210.
Mar. 5, 2020 Office Action for corresponding U.S. Appl. No. 16/183,736.
May 4, 2020 Office Action for corresponding U.S. Appl. No. 16/154,718.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.
Oct. 19, 2020 Notice of Allowance for corresponding U.S. Appl. No. 16/157,075.
Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.
International Search Report and Written Opinion dated Jan. 9, 2020 for PCT/US2019/055488.
International Search Report and Written Opinion dated Jan. 14, 2020 for PCT/US2019/060174.
International Search Report and Written Opinion dated Jan. 17, 2020 for PCT/US2019/058997.
International Search Report and Written Opinion dated Feb. 22, 2019 for PCT/US2018/065584.
International Search Report and Written Opinion dated Mar. 9, 2020 for PCT/US2019/059949.
International Search Report and Written Opinion dated Apr. 1, 2020 for PCT/US2019/055483.
International Search Report and Written Opinion dated Nov. 28, 2018 for PCT/US2018/049813.
International Search Report and Written Opinion dated Dec. 30, 2019 for PCT/US2019/062629.
Dec. 8, 2020 Notice of Allowance for corresponding U.S. Appl. No. 16/947,802.

\* cited by examiner

DYNAMIC FORMATION OF INSIDE SALES TEAM OR EXPERT SUPPORT TEAM

BACKGROUND

Many products and services, including cloud- or web-based products and services, computing systems and other software products, industrial goods and commodities, et cetera, are increasingly being sold over the phone by tele-agents. Such sales are often for complex systems and to very sophisticated customers. These tele-agents are often able to modularize and customize products bringing increased efficiency and efficacy to their customers.

For example, cloud-based or web-services products are highly customizable and various products may be combined to provide the best solution for the customer and can be further customized based upon region or industry. Such cloud-based web services often include computing applications, database applications, migration applications, network and content delivery applications, business management tools, business analytics, artificial intelligence, mobile services, and many more applications.

Customer Relationship Management ("CRM") is an approach to managing a company's interaction with current and potential customers. CRM implements data analysis of customers' history with a company to improve business relationships with customers, specifically focusing on customer retention and sales growth. CRM systems compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales. Some CRM software is available through cloud systems, software as a service (SaaS), delivered via network and accessed via a browser instead of installed on a local computer. Businesses using cloud-based CRM SaaS typically subscribe to such CRM systems, paying a recurring subscription fee, rather than purchasing the system outright.

Despite their sheer size, many CRM systems today lack the infrastructure to make full use of the information they can access. It is desirable, therefore, to employ an enterprise CRM system to automatically formulate an inside sales team or expert support team based on the data contained therein, thereby enhancing sales and support.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
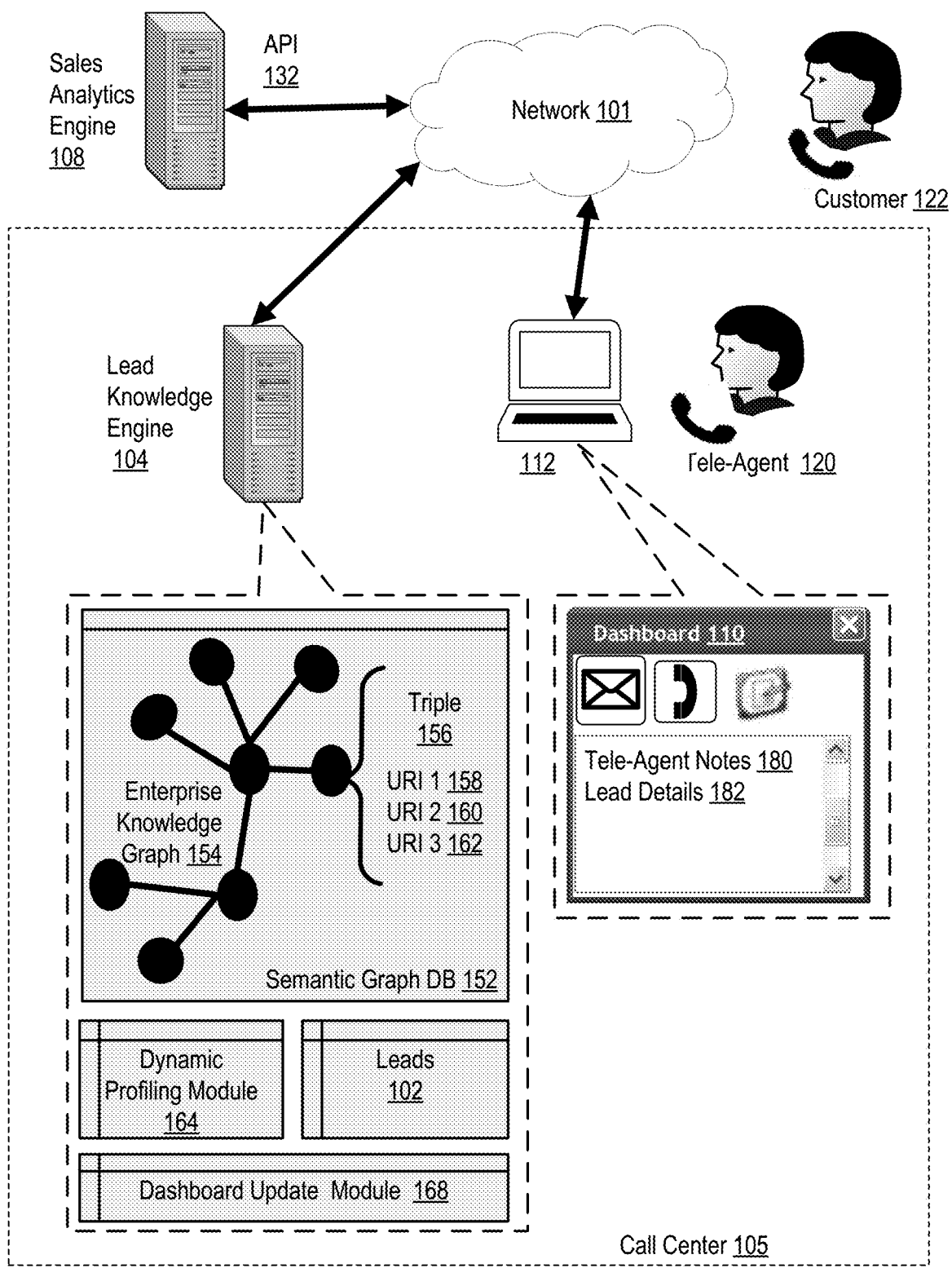
FIG. 1 is a functional block diagram of an example CRM system that implements automatic formation of an inside sales team or expert support team based on CRM and marketing data according to one or more embodiments of the present invention.

Methods, systems, products and other features for automatic formation of an inside sales team or expert support team based on CRM and marketing data are described with reference to the accompanying drawings beginning with FIG. 1. FIG. 1 sets forth a network diagram of a CRM system 99 for automatic team formation according to example embodiments of the present invention.

Cloud-based applications, web-services applications, computing systems and other software products are increasingly being sold over the phone by tele-agents. These tele-agents are often able to modularize and customize product offerings bringing increased efficiency and efficacy to their customers. For example, cloud-based or web-services products are highly customizable and various products may be combined to provide the best solution for the customer and can be further customized based upon region or industry. Such cloud-based web services often include computing applications, database applications, migration applications, network and content delivery applications, business management tools, business analytics, artificial intelligence, mobile services and many more applications. Examples of providers of such software, cloud-computing platforms, and web-services include Amazon, Microsoft, Oracle, and many others.

A tele-agent 120 at that term is used in this specification is a person who handles incoming or outgoing customer calls for business, such as, for example, software, hardware or cloud-based web services sales. Such tele-agents are often subject matter experts regarding the products that they sell and support and often work in call centers handling sales, inquiries, customer complaints support issues and other related sales and support operations. The term tele-agent as it is used in this specification is meant to be inclusive and not limiting. Other example names for a tele-agent include call center agent, customer service representative, telephone sales or service representative, attendant, associate, operator, account executive or team member.

Tele-agent 120 is an agent of a contact center 105, responsible for selling or supporting commercial products and services. CRM contact center 105 is an organization of personnel and computer resources that provide CRM according to embodiments of the present invention. In the example of FIG. 1, a region demarked by dotted lines indicates the extent of contact center 105. The extent is logical rather than physical. All of the resources and personnel that make up the contact center can have the same physical location, or the contact center can be highly virtualized, with separate physical locations for tele-agents, for client devices, and for servers, for example. Some or all tele-agents can work together in a call center that provides agents with desks, workstations, telephones, and so on. All or some of the tele-agents can work from home offices or from mobile locations.

Time with any customer is valuable and every organization should have the most knowledgeable and experienced tele-agents available for a specific campaign or market segment to maximize the efficiency and efficacy of the organization. FIG. 1 therefore sets forth a simplified block diagram of an example system for automatic formation of an inside sales team or expert support team based on CRM and marketing data according to embodiments of the present invention.

A lead, as that term is used in this specification, represents a current or potential customer or client as structured data, typically including a lead ID, lead name, company, role of the lead, address of the lead or company, phone number of the lead and other relevant information as will occur to those of skill in the art. Such a lead may be implemented as a record, message, object, or other data structure useful to automated computing machinery for automatic lead generation according to embodiments of the present invention.

CRM system 99 according to embodiments of the present invention includes a lead knowledge engine 104, a sales analytics engine 108, and one or more tele-agent stations 112 interconnected via a network 101. Lead knowledge engine 104, sales analytics engine 108, and tele-agent stations 112 may be implemented as instances of automated computing machinery.

Automated computing machinery, as that phrase is used in this specification, means a module, segment, or portion of code or other automated computing logic, hardware, software, firmware, or the like, as well as a combination of any of the aforementioned, local or remote. Automated computing machinery is often implemented as executable instructions, physical units, or other computing logic for implementing specified logical functions.

As illustrated in FIG. 1, lead knowledge engine 104 may be implemented using a computer server located within call center 105. However, other configurations may be employed as understood by routineers in the art. Similarly, sales analytics engine 108 is illustrated as implemented using a remote server or cloud service, but other suitable configurations may be used. Tele-agent stations 112 are automated computing machinery each configured for CRM with CRM-related I/O through a display, a graphical user interface, or a speech-enabled interface that accepts and recognizes speech from a user and optionally expresses to a user voice prompts and speech responses. Tele-agent stations 112 may include desktop computers, tablets, smart phones, and laptop computer, any or all of which can serve as a workstation for tele-agent 120 carrying out CRM in, for example, contact center 105.

The lead knowledge engine 104 of FIG. 1 is implemented for automatic formation of an inside sales team or expert support team based on CRM and marketing data according to embodiments of the present invention. Lead knowledge engine 104 is capable of querying various available resources and providing relevant lead and marketing data relevant to selling or supporting products or services for a lead or collection of leads having similar characteristics. Available resources may include resources inside and outside of a particular company operating the lead knowledge engine and in various marketplaces for procuring leads. Such a lead knowledge engine 104 advantageously provides details about the relevant products and services that may interest a lead or collection of similar leads.

In the example system of FIG. 1, the lead knowledge engine 104 includes a dynamic profiling module 164. Dynamic profiling module 164 is configured to query a plurality of internal tele-agent dashboard applications 110 and receive, in response to the query, sales information identifying sales of products made by the tele-agent 120 associated with the tele-agent dashboard applications 110. Only one tele-agent is depicted in the example of FIG. 1. This is for ease of explanation and not for limitation. In typical embodiments, the dynamic profiling module 164 will query many tele-agent dashboard applications 110 and receive sales information from many tele-agents 120.

In a thin-client architecture, dashboard 110 may be displayed in a web browser running on tele-agent station 112 and be generated suing hypertext markup language (HTML) forms, cascading style sheets (CSS) and Java, PHP, Perl or similar scripting languages, as known to routineers in the art. In a thin-client architecture, a dashboard update module 168 is preferably a high-capacity web server that hosts one or more web server software applications for selectively and securely allowing one or more tele-agent stations 112 access over internet or other network 101 for transfer of hypertext markup language (HTML) files and the like. A browser plugin or application programming interface (API) may also be used as appropriate. In a thick-client architecture arrangement, a dashboard update module 168 may directly generate dashboard display 110 on tele-agent station 112. Regardless, dashboard display 110 ideally employs ideally employs standard windows-type display and control mechanisms including windows, client windows, frames, flexboxes, icons, buttons, check boxes, radio buttons, scroll bars, drop-down menus, pull-down menus, drill-down mechanisms, tabs, bar graphs, panes, panels, forms, slide bars, selection boxes, dialog boxes, text boxes, list boxes, menu bars, bar graphs, widgets, wizards, et cetera. The selection and layout of the user interface components, and the placement thereof, may vary widely within the scope of the present disclosure and may optionally be customized by each user. Ideally, dashboard update module 168 employs responsive site design techniques so as to automatically adjust layout and design to be readable and usable at any screen width. As user interface programming and design are well known in the art, further detail is omitted.

Sales information of products collected from tele-agent 120 may be actual sales made by the tele-agent recorded in the process of the sale, interest in a product shown by a customer interacting with the tele-agent, relevant notes recorded by the tele-agent 120 regarding products sold by the tele-agent or any other relevant sales information that will occur to those of skill in the art. Collection of such sales information has a twofold purpose: To identify products or services that may be of interest to a given lead or set of leads, and to identify particular tele-agents who may have particular subject matter expertise or experience with a given set of products or services.

The tele-agent dashboard application 110 is an application used by a tele-agent 120 to organize and support telephonic sales. In the example of FIG. 1, the dashboard application 110 provides a vehicle for voice over internet protocol ('VOIP') telephony communications to a customer 122. The dashboard application 110 allows the tele-agent to record notes 180 describing the sales call and providing lead details 182, which are collected by lead knowledge engine 104.

The dynamic profiling module 164 of FIG. 1 is also configured to query one or more external sales analytics engines 108 and receive, in response to the query, sales information identifying external sales of products for a number of companies. Sales analytic engine 108 is an engine, typically implemented as a server, providing external sales information about various companies. Such an external sales analytics engine may be provided by a third party vendor who gathers sales information from various companies and publishes that information to its clients. Querying one or more external sales analytics may be carried out by invoking an application programming interface ("API") 132 exposed by the external sales analytic engine and receiving the information identifying external sales of products for a number of companies. Such information identifying external sales may include products being sold, how many products are being sold, companies purchasing those products, the industry of companies purchasing products, the size of those companies, the region of the world in which the products are being sold, and so on as will occur to those of skill in the art.

The dynamic profiling module 164 of FIG. 1 is also configured to create product-specific target-lead profiles in dependence upon the size of the identified companies, the industry of the identified companies, and the region of the world of the identified companies associated with specific products or services. The target-lead profiles identify companies of a particular industry and size and operating a particular region of the world. These companies are representative of companies purchasing the specified products or services. Companies meeting the criteria of a target-lead profile are considered more likely candidates to become customers of the specified products or services. The target-lead profile is also often implemented as structured data often including a profile ID, an industry, a size of company a region and a product, list of useful products or product type.

The lead knowledge engine 104 of FIG. 1 has available to it a semantic graph database 152 having stored within it a knowledge graph 154 having nodes populated with at least the sales information identifying sales of products made by the tele-agent associated with the tele-agent dashboard applications and the sales information identifying external sales of products for a number of companies. More preferably, knowledge graph 154 may consist of an enterprise level graphical database that includes all or most information describing, pertinent to, or useful in an entire corporate enterprise: Financial records, business entities and structures, employee data, incorporation data, transactions, contracts, sales history, product descriptions, and so on. Although FIG. 1 illustrates semantic graph database 152 as included within lead knowledge engine 104, it may equally be located within another discrete resource, such as a dedicated networked database server for example.

A graph database is a database that uses graph structures for semantic queries with nodes, edges and properties to represent and store data. A key concept of this database system is the graph (or edge or relationship), which directly relates data items in the data store. The relationships allow data in the store to be linked together directly, and in many cases retrieved with one operation.

The graph database contrasts with conventional relational databases, where links between data are stored in the data, and queries search for this data within the store and use the join concept to collect the related data. Graph databases, by design, allow simple and fast retrieval of complex hierarchical structures that are difficult to model in relational systems.

The underlying storage mechanism of graph databases can vary. Some depend on a relational engine and store the graph data in a table. Others use a key-value store or document-oriented database for storage, making them inherently NoSQL structures.

Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The graph database of FIG. 1 is a semantic graph database and stored within it is an enterprise knowledge graph 154. The example enterprise knowledge graph of FIG. 1 is implemented using the Resource Description Framework ('RDF'). The enterprise knowledge graph of FIG. 1 has each data item represented by a resource identifier. Such resource identifiers may include a uniform resource identifier ('URI'), an internationalized resource identifier ('IRI'), a uniform resource locator ('URL'), a literal, a non-literal, or any other resource identifier that will occur to those of skill in the art.

RDF makes resource identifier relationships between data items the central attribute of its overall data model. Resource identifiers, such as URI's, are created with data and liked together using relationships that are also named with resource identifiers, such as URI's.

The knowledge graph of FIG. 1 has the normal characteristics of mathematical directed graphs in that it consists of vertices (a.k.a. nodes) and directed edges. Each edge connects two vertices, has a type, and can have one or more properties. Each property is a key-value pair. The ability to type an edge and attach properties to it increases the semantic expressiveness of the knowledge graphs.

The RDF based knowledge graph of FIG. 1 has the notion of a logical triple 156, which consists of a subject 158, a predicate 160, and an object 162 each represented in FIG. 1 as a URI. In a triple, the subject and object are vertices and the predicate is the edge that connects the subject and object. The roles of subject and object imply the direction of the edge, which is from subject to object. An RDF graph consists of a set of triples. A database that contains RDF graphs is called a triple store.

The description of graph databases and semantic graph databases is for explanation and not for limitation. In fact, alternative embodiments may include SQL databases, relational databases, NoSQL, or any other viable database structure that will occur to those of skill in the art.

In the system of FIG. 1, the dynamic profiling module 164 identifies a product interest for a number of companies of a particular size in a particular industry in a particular region of the world by traversing the knowledge graph 154 and identifying from a plurality of nodes of the knowledge graph and the relationships among the plurality of the nodes of the knowledge graph the product interest. These nodes and their relationships are implemented in the example of FIG. 1 as triples 156 of URIs 158, 160, and 162.

To identify the product interest, the dynamic profiling module of FIG. 1 employs a semantic reasoner. A semantic reasoner, often called a reasoning engine, rules engine, or simply a reasoner, is automated computing machinery to infer logical consequences from a set of asserted facts or axioms. The notion of a semantic reasoner generalizes that of an inference engine, by providing a richer set of mechanisms to work with. The inference rules are commonly specified by means of an ontology language, and often a description logic language. Many reasoners use first-order predicate logic to perform reasoning; inference commonly proceeds by forward chaining and backward chaining.

There are also examples of probabilistic reasoners, including non-axiomatic reasoning system, and probabilistic logic networks. Some such reasoners may be derived from machine learning. Machine learning is closely related to (and often overlaps with) computational statistics, which also focuses on prediction-making through the use of computers. Machine learning has strong ties to mathematical optimization, which delivers methods, theory and application domains to the field. Machine learning is sometimes conflated or equated with data mining, where the latter subfield focuses more on exploratory data 1 and is sometimes known as unsupervised learning.

Within the field of data analytics, machine learning is a method used to devise complex models and algorithms that lend themselves to prediction; in commercial use, this is known as predictive analytics. These analytical models allow researchers, data scientists, engineers, and analysts to "produce reliable, repeatable decisions and results" and uncover "hidden insights" through learning from historical relationships and trends in the data.

Figure 2:
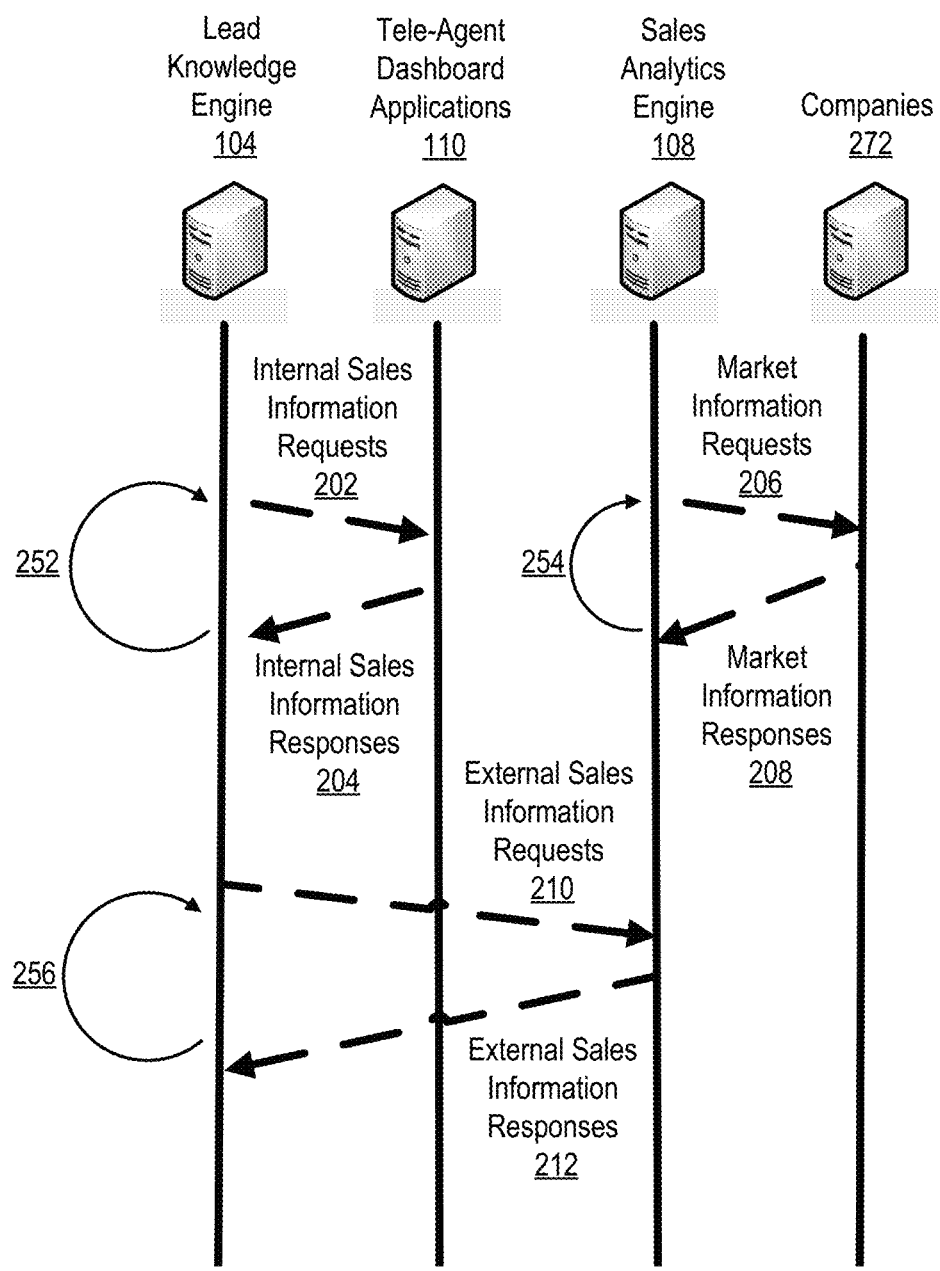
FIG. 2 sets forth a calling sequence diagram illustrating additional aspects of automatic formation of an inside sales team or expert support team based on CRM and marketing data according to example embodiments of the present invention.

For further explanation, FIG. 2 sets forth a calling sequence diagram illustrating additional aspects of automatic formation of an inside sales team or expert support team based on CRM and marketing data according to example embodiments of the present invention. In the example of FIG. 2, the lead knowledge engine 104 identifies a particular product or service that may relevant to companies of a particular size, in a particular industry and in a particular region of the world. With respect to the identified product of service, the lead knowledge engine 104 sends external sales information requests 210 to the sales analytics engine 108. The sales analytics engine 108 of FIG. 2 receives the request 210 and sends the external sales information it has gathered from the companies 272 in responses 212 to the lead knowledge engine 104. In the example of FIG. 2, the lead knowledge engine repeats 256 sending requests 210 and receiving responses 212 until the lead knowledge engine 104 has sufficient external sales information for automatic formation of an inside sales team or expert support team based on CRM and marketing data according to embodiments of the present invention as will occur to those of skill in the art.

In the example of FIG. 2, with respect to the identified product of service, lead knowledge engine 104 also sends an internal sales information request 202 to one or more tele-agent dashboard applications 110. The lead knowledge engine of FIG. 2 receives in response to the request 202 internal sales information responses 204 from the tele-agent dashboard applications 110. The internal sales information responses of FIG. 2 typically contain information describing sales or potential sales made by the tele-agents in the form of products, sales, companies, customers, region of the world where the sale was made, additional notes made by the tele-agent or any other internal sales information that will occur to those of skill in the art. In the example of FIG. 2, the lead knowledge engine repeats 252 sending requests 202 and receiving responses 204 until the lead knowledge engine 104 has sufficient internal sales information for automatic formation of an inside sales team or expert support team based on CRM and marketing data according to embodiments of the present invention as will occur to those of skill in the art.

In parallel with the lead knowledge engine 104 sending the requests 202 and receiving responses 204 for internal sales information, a sales analytics engine 108 sends market information requests 206 to companies 272 and receives from those companies market information responses containing information about external sales made by the companies 272 with respect to the identified product of service. The external sales information responses of FIG. 2 typically contain information describing sales or potential sales made by external companies often including products, sales, company IDs, customers, regions of the world where the sales were made, or any other external sales information that will occur to those of skill in the art. In the example of FIG. 2, the sales analytics engine 272 repeats 254 sending requests and receiving responses until the sales analytics has sufficient external sales information to provide to lead knowledge engine 104 for automatic formation of an inside sales team or expert support team based on CRM and marketing data according to embodiments of the present invention as will occur to those of skill in the art.

Figure 3:
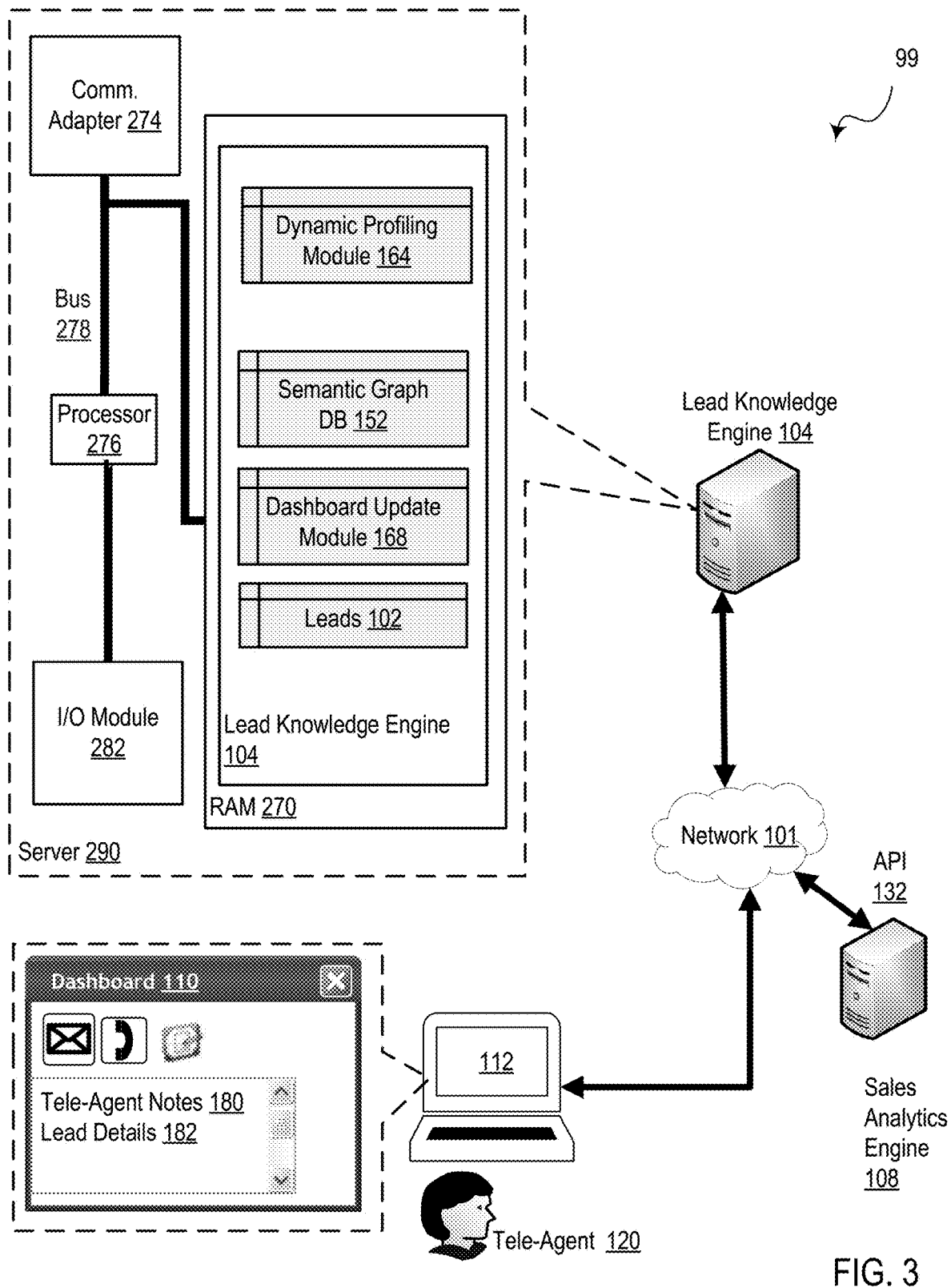
FIG. 3 is a functional block diagram of an exemplary CRM system for automatic formation of an inside sales team or expert support team based on CRM and marketing data according to embodiments of the present invention.

For further explanation, FIG. 3 sets a forth block diagram of an example CRM system 99 for automatic formation of an inside sales team or expert support team based on CRM and marketing data according to embodiments of the present invention. The CRM system 99 of FIG. 3 includes a lead knowledge engine 104 coupled for data communications through a network 101 to a number of remote resources including sales analytics engine 108. The remote resources 108 of FIG. 3 are presented in this example for explanation and not for limitation. In fact, automatic formation of an inside sales team or expert support team based on CRM and marketing data according to embodiments of the present invention may include additional remote resources as will occur to those of skill in the art.

In the example of FIG. 3, a tele-agent is capable of viewing lead details 182 on a dashboard 110 displayed on a user interface on a tele-agent station 112. Tele-agent station 112 in the example of FIG. 3 is coupled for data communications through the network 101 to the lead knowledge engine 104. In various embodiments of the present invention, a computer station used by the tele-agent may be implemented as local or remote to the lead knowledge engine 104 as will occur to those of skill in the art.

In the example of FIG. 3, the lead knowledge engine 104 is depicted as being implemented as software running on a server 290. This depiction is for explanation and not for limitation. As mentioned above, the dynamic script engine may be implemented in any number of permutations of automated computing machinery as will occur to those of skill in the art. The example server 290 of FIG. 3 ideally includes volatile and/or non-volatile memory 270, a processor 276, a communications adapter 274, and an I/O module 282 connected to a data bus 278. Lead knowledge engine 104 is illustrated as stored in memory 270. Memory 270 can include cache, random access memory ("RAM"), disk storage, and most other of computer memory, either extent or yet to be developed.

The lead knowledge engine 104 of FIG. 3 may include a dynamic profiling module 164, a semantic graph database 152, a dashboard update module 168 and a number of leads stored in memory 270, whose details may be displayed on the dashboard application 110 of the tele-agent 230. As mentioned above, the dynamic profiling module 164 includes automated computing machinery configured to query a plurality of internal tele-agent dashboard applications 110 and receive, in response to the query, sales information identifying sales of products made by the tele-agent 120 associated with the tele-agent dashboard applications 110 and query one or more external sales analytics engines 108 and receive, in response to the query, sales information identifying external sales of products for a number of companies.

The internal and external sales information, as well as other information such as tele-agent IDs, products, lead details, companies, regions of the world, surges, sales history, marketing history, and other information is stored in the semantic graph database 152. This information may be stored in as part of enterprise knowledge graph 154 (FIG. 1) using RDF triples as will occur to those of skill in the art.

The dynamic profiling module 164 of FIG. 3 is also configured to identify, from the knowledge graph in the semantic graph database 152, a product interest for a number of companies of a particular size in a particular industry in a particular region of the world and create a company profile in dependence upon the size of the identified companies, the industry of the identified companies, and the region of the world of the identified companies associated with the interest.

Figure 4:
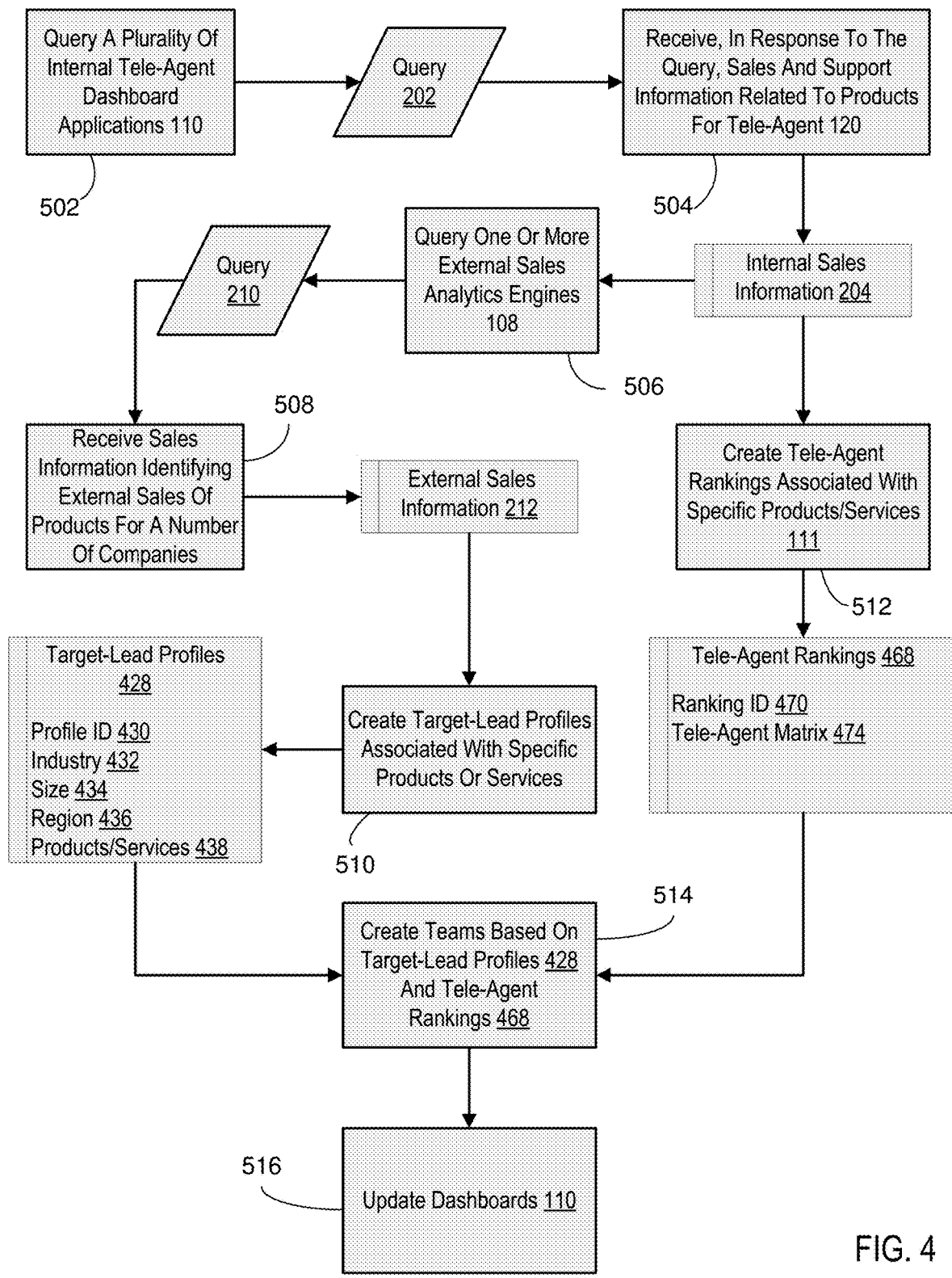
FIG. 4 is a flow chart diagram illustrating an exemplary CRM method for automatic formation of an inside sales team or expert support team based on CRM and marketing data according to embodiments of the present invention.

For further explanation, FIG. 4 sets forth a flow chart illustrating an example method of automatic formation of an inside sales team or expert support team based on CRM and marketing data according to embodiments of the present invention. The method of FIG. 4 includes the initial step 502 of querying, by dynamic profiling module 164, a plurality of internal tele-agent dashboard applications 110. At step 504, in response to the query 202, internal sales information 204 identifying sales and support of products or services made by tele-agent 120 (FIGS. 1 and 3) is provided to dynamic profiling module 164 via the tele-agent dashboard application 110. As discussed with respect to FIG. 2, steps 502 and 504 are ideally repeated by dynamic profiling module 164 for all tele-agents 120 and for all products or services of interest.

As mentioned above, a tele-agent dashboard application 110 is an application used by a tele-agent to organize and support telephonic sales. Sales information of products made by the tele-agent 120 may be actual sales made by the tele-agent recorded in the process of the sale, interest in a product shown by a customer interacting with the tele-agent, relevant notes recorded by a tele-agent 120 regarding products sold by the tele-agent or any other relevant sales information that will occur to those of skill in the art.

In addition to supplying data valuable to the determination of what products and services may be of interest to particular leads, internal sales information 204 may also include data relevant to determining which tele-agents 120 should ideally be assigned to an inside sales team or expert support team for particular products and services. This information may include expertise developed from actual sales or support with particular products and services, relationships developed with particular customers, formalized training or certification for particular products or services, and the availability, i.e., bandwidth, of particular tele-agents.

At step 506, dynamic profiling module 164 queries one or more external sales analytics engines 108 for sales information. At step 508, in response to queries 210, external sales information 212 identifying external sales of products and services for a number of companies is provided by sales analytics engine(s) 108 to dynamic profiling module 164. At step 510, dynamic profiling module 164 identifies 412 from both external sales information 212 and internal sales information 204 particular product or service interests for a number of companies of a particular size in a particular industry in a particular region of the world and creates therefrom product-specific target-lead profiles 428. In the example of FIG. 4, product-specific target-lead profiles 428 are implemented as instances of a data structure that includes a profile ID 430, an industry type 432, a company size 434, a region of the world 436, and the one or more products or services 438.

Identifying a product or service interest for a number of companies of a particular size in a particular industry in a particular region of the world according to the method of FIG. 4 may be carried out by traversing the knowledge graph 154 (FIG. 1) stored in the semantic graph database 152 (FIGS. 1 and 3) and identifying from a plurality of the nodes of the knowledge graph and the relationships among the plurality of the nodes of the knowledge graph a particular product or service interest. In some embodiments, a semantic reasoner may be used to identify a product interest as will occur to those of skill in the art.

Internal sales information 204 is used by dynamic profiling module 164 at step 512 to create tele-agent rankings 468 associated with specific products or services 111 supported by call center 305 (FIG. 1). Tele-agent rankings 468 may be derived based on expertise developed from actual sales or support with the particular products and services 111, relationships developed with particular customers, formalized training or certification for the particular products or services 111, and the availability, i.e., bandwidth, of the individual tele-agents. The more experienced and successful tele-agents are more apt to be assigned to particular inside sales or expert support teams, but dynamic profiling module 164 may optionally weight rankings to promote a degree of fairness in tele-agent assignments. Moreover, dynamic profiling module 164 may pair of less knowledgeable tele-agents with more experienced tele-agents on a particular team to promote education and advancement of the sales force as a whole.

In the example of FIG. 4, tele-agent rankings 468 are implemented as instances of a data structure that includes a ranking ID 470, a target-lead profile ID 470, which corresponds to a particular target-lead profile 428, and a tele-agent ranking matrix 474 that identifies the automatically ranked tele-agent members according to multiple criteria, include product expertise, present assignments, availability, formal training, and the like.

In one or more embodiments, lead knowledge engine 104 (FIG. 1) also stores structure and content target-lead profiles 428 and tele-agent rankings 468 as semantic triples in enterprise knowledge graph 154 (FIG. 1): The structure and content is parsed into parsed triples; lead knowledge engine 104 analyzes the parsed triples to create inferred triples. The parsed and inferred triples are then stored in enterprise knowledge graph 154 (FIG. 1). Parsed triples, inferred triples, and enterprise knowledge graph 154 (FIG. 1) are described in greater detail in co-pending U.S. application Ser. No. 16/154,718, filed on Oct. 9, 2018 and entitled "Semantic Call Notes," and U.S. application Ser. No. 16/911,717, filed on Jun. 25, 2020 and entitled "Semantic Artificial Intelligence Agent," and U.S. application Ser. No. 16/916,615, filed on Jun. 30, 2020 and entitled "Improved Enterprise Level Sales Management System and Method Including Real-Time Incentive Compensation," which are incorporated herein in their entirety by reference.

At step 514, products and/or services 428, some of which may originate from external sales, are mapped by dynamic profiling module 164 to the products and/or services 111 supported by call center 305 (FIG. 1). Dynamic profiling module 164 then automatically designates tele-agent teams, for example, inside sales teams or expert support teams, responsible for supporting particular target lead profiles 428 based on the aforementioned factors such as experience or expertise, size of the market, number of tele-agents, and availability of particular tele-agents. In particular, dynamic profiling module 164 may employ simulation and optimization algorithms to maximize profitability. As discussed, supra, probabilistic reasoners, including non-axiomatic reasoning system, and probabilistic logic networks, computational statistics, which focuses on prediction-making through the use of computers, and machine learning techniques, having strong ties to mathematical optimization, may be used to devise complex models and algorithms that lend themselves to prediction and optimization of the tele-agent force. Additionally, dynamic profiling module 164 may designate team leaders, alternates, and the like. The method of FIG. 4 may be repeated periodically over time taking advantage of additional tele-agent feedback collected via dashboard 110 to optimize team assignments. For example, tracking of missed calls, long hold times with customers, over- or under-utilized tele-agents, et cetera, may be used to refine team assignments.

The lead knowledge engine 104 (FIG. 1) also includes a tele-agent dashboard update module 168. The tele-agent dashboard update module 168 is implemented as automated computing machinery configured to parse the leads 102 associated with a particular target-lead profile 428 for the one or more tele-agents automatically identified with the associated team assignment matrix 474. At step 516, tele-agent dashboard update module 168 transmits the parsed leads to associated one or more tele-agent dashboard applications 110. Parsing the leads for the tele-agents provides to each selected tele-agent leads that are relevant to the sales, support, and products associated with the particular tele-agent and the unique aspects of the campaign for which they are engaged. Parsing the leads 102 for one or more tele-agents may be automatically carried out by lead knowledge engine 104 by selecting leads for a particular tele-agent team based on factors such as the products sold by those tele-agents, experience of the tele-agents, region of the world serviced by the tele-agents, industry serviced by the tele-agents and many other factors that will occur to those of skill in the art. As illustrated in FIG. 1, the lead details 182 are displayed to the tele-agents on the dashboard application 110 rendered on the tele-agents' computer stations 112.

FIGS. 1-4 illustrate the architecture, functionality, and operation of possible implementations of systems, methods and products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in a block may occur out of the order noted in the figures. For example, two blocks shown before or after one another may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The Abstract of the disclosure is solely for providing the a way by which to determine quickly from a cursory reading the nature and gist of technical disclosure, and it represents solely one or more embodiments.

The above-described embodiments of the present disclosure are merely possible examples of implementations set forth for a clear understanding of the principles of the disclosure. Variations and modifications may be made to the above-described embodiment(s) without departing substantially from the spirit and principles of the disclosure. All such modifications and variations are intended to be included herein within the scope of this disclosure and protected by the following claims.

What is claimed is:

1. A customer relationship management system comprising:
   a lead knowledge engine implemented as a first instance of software running on a server, the lead knowledge engine including a dynamic profiling module and a dashboard update module that are also implemented as software running on the server; and
   a plurality of tele-agent stations each configured to execute a tele-agent dashboard application thereon, the tele-agent stations operatively coupled to the lead knowledge engine via a computer network,
   wherein the dynamic profiling module is configured to:
      query, over the computer network, the tele-agent dashboard applications executing on the plurality of tele-agent stations at remote locations with respect to the server, and receive, in response and over the computer network, internal sales information, said internal sales information including the identification of sales of products or services made by a plurality of tele-agents associated with the tele-agent dashboard applications;
      query, over an application programming interface (API), one or more external sales analytics engines and receive, in response, external sales information, said external sales information including an identification of external sales of products or services for a number of companies;
      create a target-lead profile in dependence upon the external sales information and the internal sales information, wherein the target-lead profile is stored as one or more semantic triples in an enterprise knowledge graph that includes a plurality of nodes populated with the internal sales information and the external sales information;
      generate a tele-agent ranking that ranks tele-agents according to multiple criteria, in dependence upon the internal sales information, wherein the tele-agent ranking is stored as one or more semantic triples in the enterprise knowledge graph; and identify a tele-agent team in dependence upon the target-lead profile and the tele-agent ranking, wherein the dynamic profiling module is configured to identify the tele-agent team by traversing the enterprise knowledge graph.

2. The system of claim 1 wherein the dashboard update module is configured to parse leads and transmit the parsed leads to one or more of the tele-agent dashboard applications in dependence of the tele-agent team.

3. The system of claim 1 wherein the lead knowledge engine further comprises a semantic graph database that stores the enterprise knowledge graph.

4. The system of claim 1 wherein each of the plurality of nodes includes three resource identifiers.

5. The system of claim 3 wherein the lead knowledge engine is designed and arranged to iteratively traverse said semantic graph database and apply semantic reasoning at each of said plurality of nodes.

6. The system of claim 1 wherein the dynamic profiling module is configured to establish, as structure of computer memory of the first instance of automated computing machinery, the external sales information and the internal sales information as object-oriented modules of automated computing machinery.

7. The system of claim 1 wherein the dynamic profiling module is configured to establish, as structure of computer memory of the first instance of automated computing machinery, the target-lead profile and the tele-agent ranking as object-oriented modules of automated computing machinery.

8. The system of claim 1 wherein the target-lead profile includes a profile identification, an industry designation, a size designation, a region designation, and a products/services designation.

9. The system of claim 1, wherein storing the target-lead profile as one or more semantic triples in the enterprise knowledge graph comprises:
  parsing structure and content of the target-lead profile to generate one or more parsed triples;
  analyzing the one or more parsed triples to create one or more inferred triples; and
  storing the parsed triples and the inferred triples as the semantic triples in the enterprise knowledge graph.

10. The system of claim 1, wherein storing the tele-agent ranking as one or more semantic triples in the enterprise knowledge graph comprises:
  parsing structure and content of the tele-agent ranking to generate one or more parsed triples;
  analyzing the one or more parsed triples to create one or more inferred triples; and
  storing the parsed triples and the inferred triples as the semantic triples in the enterprise knowledge graph.

11. A computer-implemented method of customer relationship management comprising:
  querying, over a computer network by a dynamic profiling module implemented as a first instance of software running on a server, a plurality of tele-agent dashboard applications on a plurality of tele-agent stations at remote locations with respect to the server, and receiving, in response, internal sales information, said internal sales information including identification of sales of products or services made by a plurality of tele-agents associated with the tele-agent dashboard applications;
  querying, over an application programming interface (API) by the dynamic profiling module, one or more external sales analytics engines and receiving, in response, external sales information, said external sales information including an identification of external sales of products or services for a number of companies;
  creating by the dynamic profiling module a target-lead profile in dependence upon the external sales information and the internal sales information, wherein the target-lead profile is stored as one or more semantic triples in an enterprise knowledge graph that includes a plurality of nodes populated with the internal sales information and the external sales information;
  generating, by the dynamic profiling module, a tele-agent ranking that ranks tele-agents according to multiple criteria, in dependence upon the internal sales information, wherein the tele-agent ranking is stored as one or more semantic triples in the enterprise knowledge graph; and
  identifying by the dynamic profiling module, a tele-agent team in dependence upon the target-lead profile and the tele-agent ranking, wherein the dynamic profiling module is configured to identify the tele-agent team by traversing the enterprise knowledge graph.

12. The method of claim 11 further comprising:
  parsing by a dashboard update module, implemented as a second instance of automated computing machinery, leads; and
  transmitting by the dashboard update module the parsed leads to one or more of the tele-agent dashboard applications in dependence of the tele-agent team.

13. The method of claim 11 further comprising:
  storing the knowledge graph as a semantic graph database.

14. The method of claim 13 wherein each of the plurality of nodes includes three resource identifiers.

15. The method of claim 13 further comprising:
  iteratively traversing said semantic graph database; and
  applying semantic reasoning at each of said plurality of nodes.

16. The method of claim 11 further comprising:
  establishing by the dynamic profiling module as structure of computer memory the external sales information and the internal sales information as object-oriented modules of automated computing machinery.

17. The method of claim 11 further comprising:
  establishing by the dynamic profiling module as structure of computer memory the target-lead profile and the tele-agent ranking as object-oriented modules of automated computing machinery.

18. The method of claim 11 wherein the target-lead profile includes a profile identification, an industry designation, a size designation, a region designation, and a products/services designation.

19. The method of claim 11, wherein storing the target-lead profile as one or more semantic triples in the enterprise knowledge graph comprises:
  parsing structure and content of the target lead-profile to generate one or more parsed triples;
  analyzing the one or more parsed triples to create one or more inferred triples; and
  storing the parsed triples and the inferred triples as the semantic triples in the enterprise knowledge graph.

20. The method of claim 11, wherein storing the tele-agent ranking as one or more semantic triples in the enterprise knowledge graph comprises:
  parsing structure and content of the tele-agent ranking to generate one or more parsed triples;

analyzing the one or more parsed triples to create one or more inferred triples; and storing the parsed triples and the inferred triples as the semantic triples in the enterprise knowledge graph.

\* \* \* \* \*